United States Patent [19]

Ogawa et al.

[11] Patent Number: 4,769,950
[45] Date of Patent: Sep. 13, 1988

[54] WEATHER STRIP FOR AUTOMOBILE

[75] Inventors: Kazuo Ogawa, Shuchi; Haruhisa Kawase, Nagoya; Kunio Mishima, Inazawa, all of Japan

[73] Assignee: Toyoda Gosei Co., Ltd., Nishikasugai, Japan

[21] Appl. No.: 38,356

[22] Filed: Apr. 14, 1987

[30] Foreign Application Priority Data

Apr. 15, 1986 [JP] Japan .................................. 61-86394
Nov. 18, 1986 [JP] Japan .................................. 61-177224
Jan. 27, 1987 [JP] Japan .................................. 62-16473

[51] Int. Cl.$^4$ .............................................. E06B 7/16
[52] U.S. Cl. ........................................ 49/490; 49/497; 428/122; 428/358
[58] Field of Search ................. 49/490, 491, 497, 496; 428/122, 358

[56] References Cited

U.S. PATENT DOCUMENTS

| | | | |
|---|---|---|---|
| 4,046,940 | 9/1977 | Prikkel, III | 49/497 X |
| 4,432,166 | 2/1984 | Weimar | 49/487 X |
| 4,513,044 | 4/1985 | Shigeki et al. | 49/490 X |
| 4,531,326 | 7/1985 | Ballocca et al. | 49/487 |

Primary Examiner—Philip C. Kannan
Attorney, Agent, or Firm—Cushman, Darby & Cushman

[57] ABSTRACT

A weather strip to be installed around an opening of an automobile, has a trim portion of a letter U-shaped section, which is composed of parallel side walls and a bottom wall connecting the side walls, and a seal portion projecting from an outer surface of one of the parallel side walls, which is positioned on the outside of the automobile when the trim portion is mounted on a flange formed around the opening. The bottom wall is inclined in such a direction as to make an acute angle with the one side wall. In the weather strip wherein the bottom wall is inclined with respect to the side walls, the trim portion can be prevented from twisting and leaning even when being curved along the corner portion, and mounted thereon. And at this time, good sealing properties can be maintained together with good external appearance.

6 Claims, 5 Drawing Sheets

WEATHER STRIP FOR AUTOMOBILE

BACKGROUND OF THE INVENTION

1. Field of the Invention

The present invention relates to a weather strip to be installed around a door opening and a window opening of an automobile body

2. Description of the Prior Art

FIG. 7 illustrates a conventional weather strip which has been installed around a quarter window 1(FIG. 1).

The weather strip is provided with a trim portion 2 having a U-shaped cross section, and a hollow seal portion 3 projecting from an outer surface of one side wall 2a of the trim portion 2 and coming in contact with a quarter window glass 8. A core member 5 composed of a large number of longitudinallY disconnected core pieces is embedded within the trim portion 2. A seal lip 4 is formed in a tip end of the side wall 2a.

This weather strip is mounted on a flange 7 formed around the quarter window 1 through retaining lips 6 projecting toward the inside of the trim portion 2.

It is known that when this weather strip is curved and mounted on the flange 7 of a rear corner portion C of the quarter window 1 in FIG. 1 as an example, the weather strip is twisted in the direction shown by an arrow Y in FIG. 8 and the bottom side of the trim portion undesirably leans in the direction of the inside of the automobile. And also, then the weather strip is horizontally curved as shown in FIG. 9 without being mounted on a flange, the weather strip twists and leans in the direction of arrows Y similar to the ease when being mounted on the flange.

The above described undesirable twist and lean of the weather strip results in gaps being formed between the seal lip 4 and some retaining lips 6, and the flange 7, and accordingly, sealing property being decreased.

SUMMARY OF THE INVENTION

It is an object of the present invention to provide a weather strip which is free from the above described undesirable twist and lean then being installed in corner portions of openings of automobiles.

According to the present invention, a bottom wall 2c of the trim portion 2 of the weather strip is made inclined so as to make an acute angle with the side wall 2a positioned on the side of the hollow seal portion 3 for attaining the above described object.

Upon making various experiments, the present inventors have confirmed that the above described undesirable twist and lean can be prevented by inclining the bottom wall 2c.

Furthermore, according to one embodiment of the present invention, the inner surface 22 of the bottom wall 2c which is inclined as described above, is formed perpendicular to the side walls 2a and 2b, and a groove 21 is formed at the corner of the bottom wall 2c and the side wall 2a positioned on the side of the hollow seal portion 3 as shown in FIG. 3.

When the weather strip is mounted on a flange 7(FIG. 3), the flange 7 is often excessively pressed inwardly until strongly coming in contact with the inner surface of the bottom wall 2c. At this time, in the case of the weather strip shown in FIG. 2, a tip end of the flange slides on the inner surface of the inclined bottom wall 2c, and moves in the direction of the side wall 2a.

This results in the weather strip being often mounted with the side walls inclined with respect to the flange 7.

By forming the inner surface 22 of the bottom wall 2c uninclined as shown in FIG. 3, the slide of the flange 7 can be prevented.

In this embodiment the groove 21 is formed for facilitating the production of weather strips. Namely, the weather strip is produced by extruding a material into a flat band like shape and bending into a letter U shape to form the trim portion 2. In this case, when the portion for forming the corner of the bottom wall 2c and the side wall 2a is thick, the bending work becomes difficult. For this reason, the groove 21 is formed so that the thickness of the above described corner portion becomes equal to that of the side walls 2a and 2b.

According to another embodiment of the present invention, a thick walled portion 40 is formed at a tip end of the side wall 2b positioned on the side opposite to the seal portion 3 as shown in FIGS. 5 and 6. BV forming the thick walled portion 40, the undesirable twist and lean of the trim portion 21 can be prevented.

In the weather strip according to the present invention, the side walls thereof are not inclined with respect to the flange if the weather strip is curved along a corner portion on which the weather strip is to be installed, and good sealing property is maintained over the whole length of the weather strip as well as good external appearance.

DETAILED DESCRIPTION OF THE EMBODIMENTS

Figure 1:
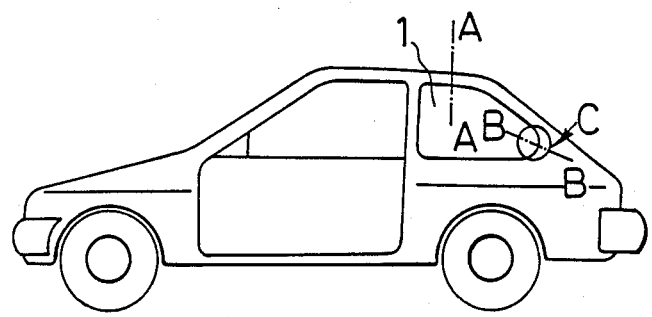
FIG. 1 is a side view of an automobile.
Figure 2:
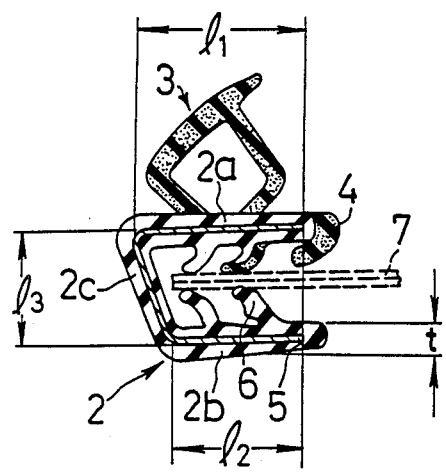
FIG. 2 is a sectional view of a first embodiment of a weather strip according to the present invention.

In a first embodiment shown in FIG. 2, a trim portion 2 of a weather strip is made of solid rubber and is composed of parallel side walls 2a and 2b, and a bottom wall 2c into a letter U-shaped cross seotion. A core member 5 composed of a large number of longitudinally disconnected core pieces, is embedded within the trim portion 2.

The trim portion 2 is formed to have a uniform thickness. Flange retaining lips 6 project from the inner surface of each of the side walls 2a and 2b. The bottom wall 2c is inclined in such a direction as to make an acute angle with the side wall 2a. A seal lip 4 made of sponge rubber is formed at a tip end of the side wall 2a and a hollow seal portion 3 made of sponge rubber is formed on the outer surface of the side wall 2a.

This weather strip is produced by extruding a material to form a flat band shaped trim portion 2 in which the core member 5 is embedded, and a hollow seal portion 3 projecting from one end portion of one flat surface of the flat band-shaped trim portion 2, and bending flat band-shaped trim portion 2 so as to have a letter-U shaped section as shown in FIG. 2.

This weather strip is mounted on the flange 7 formed around an opening of a window of an automobile so that the hollow seal portion 3 is positioned on the outside of the automobile.

Figure 7:
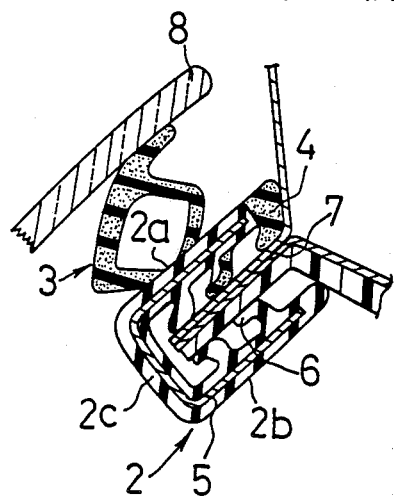
FIG. 7 is a sectional view of a conventional weather strip taken along the line of A—A of FIG. 1.
Figure 8:
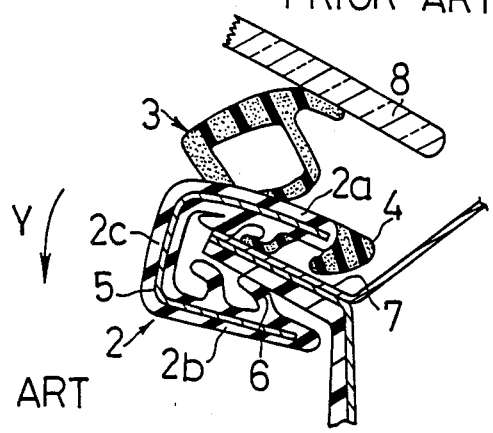
FIG. 8 is a sectional view of a conventional weather strip taken along the line of B—B of FIG. 1.
Figure 9:
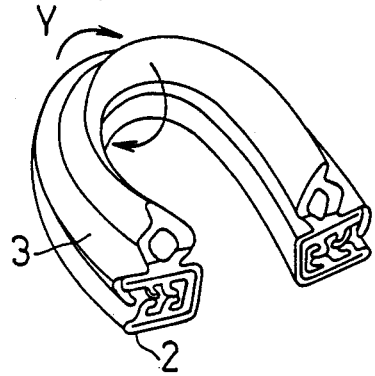
FIG. 9 is a view illustrating the twisting condition of the conventional weather strip which is horizontally curved.

Hereinafter, experimental results on the weather strip according to the present invention, of which the bottom wall 2c is inclined as shown in FIG. 2, and the conventional weather strip as shown in FIG. 7, will be explained.

Figure 10:
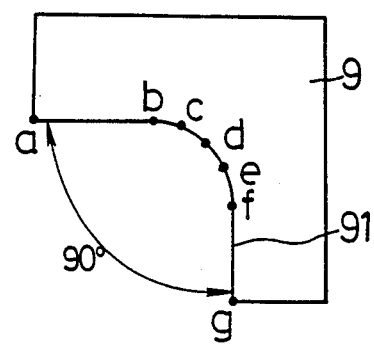
FIG. 10 is a plan view of a measuring instrument used in experiments.
Figure 11:
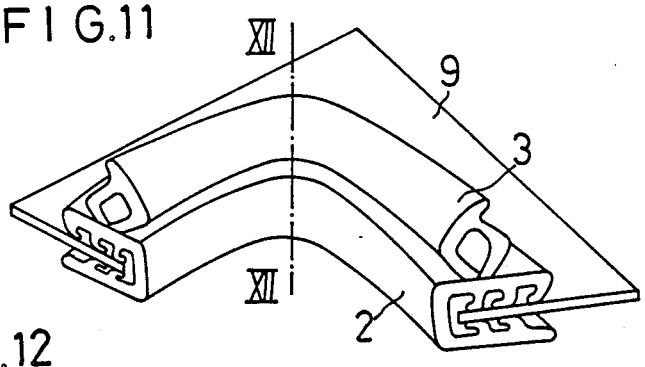
FIG. 11 is a view illustrating the condition that the weather strip is installed on the measuring instrument.
Figure 12:
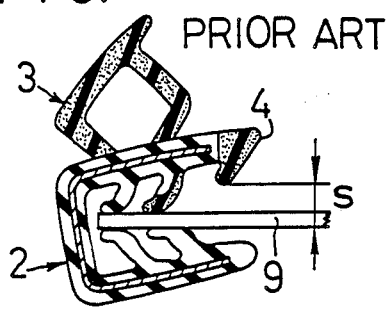
FIG. 12 is a sectional view taken along the line of XII—XII of FIG. 11.

As shown in FIG. 10, a plate shaped measuring instrument 9 having a corner portion 91 of which the radius of curvature is 30 mm, is prepared and the weather strip is curved along the corner portion 91 and mounted thereon. Then, the distance S between the seal lip 4 and the instrument 9 as shown in FIG. 12 is measured. In FIG. 10, the reference characters a through g denote measured points. The size of the weather strip according to the present invention, on which experiments are made is as follows:

l1=18 mm
l2=14 mm
l3=10 mm
t=2 mm

And in the conventional weather strip, the bottom wall 2c makes a right angle with both the side walls 2a and 2b, and the size thereof is as follws:

l1=l2=18 mm

Other size of the conventional weather strip is equal to that of the above described weather strip according to the present invention.

Figure 13:
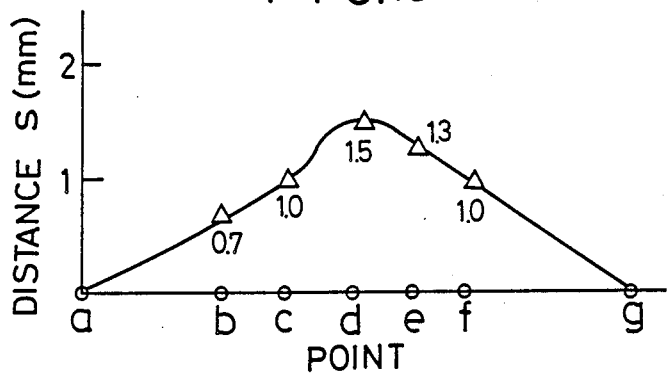
FIG. 13 is a view showing experimental results.

FIG. 13 shows the experimental results. Marks O denotes those of the weather strip according to the present invention and marks Δ denote those of the conventional weather strip. In the conventional weather strips, the trim portion twists and leans to the inside of the corner portion so that the distance S becomes large. In contrast, in the weather strip according to the present invention. such twist and lean is not observed and the seal lip 4 and the instrument 9 are closely attached to each other (S=0) even in the corner portion.

As described above, in the weather strip according to the present invention, therein the bottom wall is inclined with respect to the side walls, the trim portion can be prevented from twisting and leaning even when being curved along the corner portion and mounted thereon, and at this time, good sealing properties can be maintained together with good external appearance.

Figure 3:
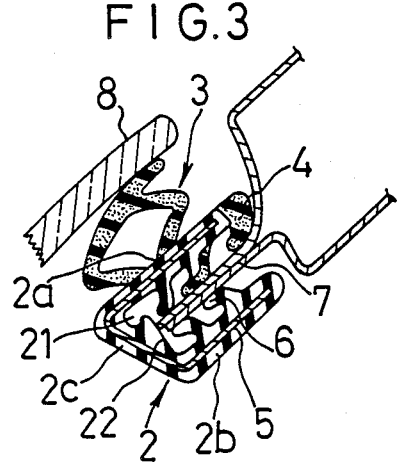
FIG. 3 is a sectional view of a second embodiment of the weather strip according to the present invention, which is installed in the automobile.

FIG. 3 illustrate a second embodiment of the weather strip according to the present invention. In the second embodiment, the bottom wall 2c is inclined similar to the first embodiment. The thickness of the bottom wall 2c is increased from the side of the side wall 2b toward the side of the side wall 2a and the inner surface 22 of the bottom wall 2c makes a right angle to each of the side walls 2a and 2b. And a groove 21 is formed at one end of the inner surface 22 of the bottom wall 2c on the side of the side wall 2a. This results in the thickness of the corners formed in both ends of the bottom wall 2c becoming equal to each other.

The other structure of the weather strip of the second embodiment is equal to that of the first embodiment shown in FIG. 2.

According to the second embodiment wherein the above described inner surface 22 is formed, even when the flange 7 is pressed against the bottom wall 2c, a tip end of the flange 7 is prevented from sliding on the inner surface 22, and accordingly the trim portion 2 and the flange 7 are not inclined with respect to each other.

And according to the second embodiment, the groove 21 is provided at one corner of the trim portion 2 to decrease the thickness thereof. This groove 21 facilitates the bending work for forming the corner thereof.

Figure 4:
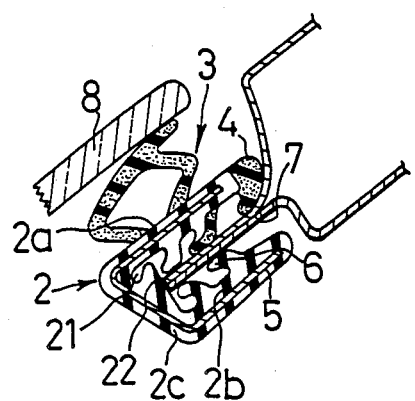
FIG. 4 is a sectional view of a third embodiment of the weather strip according to the present invention, which is Installed in the automobile.

Furthermore, the weather strip according to the second embodiment, is not inclined similar to that of the first embodiment even then being curved along a corner portion of an opening of an automobile and mounted thereon. FIG. 4 illustrates a third embodiment of the weather strip according to the present invention. In the third embodiment, the opening of the groove 21 is made narrower than the thickness of the flange 7. The other structure of the third embodiment is equal to that of the second embodiment.

When the weather strip is mounted on the flange 7, the flange 7 is sometimes pressed into the trim portion 2 in a direction inclined with respect to the side walls 2a and 2b. In such a case, the tip end o±the flange often fits into the groove 21 and accordingly, the mounting condition of the weather strip relative to the flange 7 cannot be corrected.

By narrowing the opening of the groove 2i according to the third embodiment, the above described inconvenience can be overcome and the tip end of the flange 7 can be prevented from entering into the groove 21.

Figure 5:
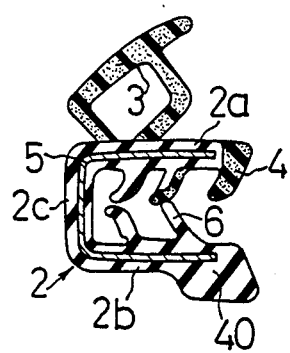
FIG. 5 is a sectional view of a fourth embodiment of the weather strip according to the present invention, which is installed in the automobile.

FIG. 5 illustrates a fourth embodiment of the weather strip according to the present invention.

The trim portion 2 of the weather strip is made of solid rubber and is composed of parallel side walls 2a and 2b and a bottom wall 2c so as to have a letter U-shaped section. And a oore member 5 is embedded in the trim portion 2.

Flange retaining lips 6 project from the inner surfaces of each of the side walls 2a and 2b. A seal lip 4 made of sponge rubber is formed at a tip end of the side wall 2a and a hollow seal portion 3 made of sponge rubber is formed on the outer surface of the side wall 2a.

A tip end of the side wall 2b positioned on the side opposite to the seal portion 3 has a thick walled portion 40 which outwardly expands to the thickness of about two times as large as that of the other portion of the side wall 2b.

Figure 6:
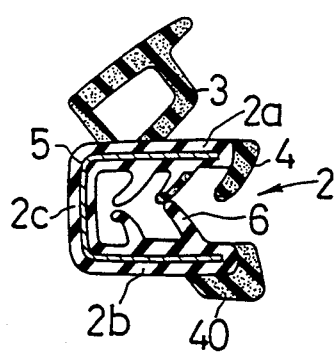
FIG. 6 is a sectional view of a fifth embodiment of the weather strip according to the present invention, which is installed in the automobile.

FIG. 6 illustrates a fifth embodiment of the weather strip according to the present invention. In the fifth embodiment, the thick walled portion 40 is made of sponge rubber. The other structure of the fifth embodiment is equal to that of the fourth embodiment.

The experimental results on the weather strips of the fifth and sixth embodiments show that the undesirable twist and lean of the trim portion thereof is not observed even when being mounted on the corner portion.

What is claimed is:

1. A weather strip to be installed around an opening of an automobile, which has a corner portion, comprising:
    a trim portion having a letter U shaped section and composed of parallel side walls and a bottom wall connecting said side walls, which is to be mounted on a flange formed around the opening; and
    a seal portion projecting from an outer surface of one of said parallel side walls. which is positioned on the outside of the automobile then said trim portion is mounted on the flange, and being to come in contact with an opposed member for closing the opening;
    said bottom wall being inclined in such a direction as to make an acute angle with said one side wall.

2. A weather strip according to claim 1, wherein the thickness of said bottom wall is increased from the other side wall toward said one side wall, an outer surface of said bottom wall makes an acute angle with an outer surface of said one side wall, an inner surface of said bottom wall is perpendicular to an inner surface of said parallel side walls, a groove is formed in an inner surface at a corner of said bottom wall and said one side wall, and the thickness of said corner is nearly equal to the thickness of another corner of said bottom wall and said other side wall.

3. A weather strip according to claim 2, wherein the width of an opening of said groove is narrower than the thickness of said flange.

4. A weather strip to be installed around an opening of an automobile body, which has a corner portion, comprising:
    a trim portion made of solid rubber which has a U-shaped cross-section including a pair of parallel side walls and a bottom wall connecting said side walls and which is to be mounted on a flange formed around the opening;
    a seal portion made of sponge rubber, projecting from an outer surface of one of said side walls of said trim portion, which is positioned on the outside of the automobile when said trim portion is mounted on said flange, and coming in contact with an opposed member for closing the opening;
    a thick-walled portion formed at an end portion of the other one of said side walls of said trim portion, the thickness of said thick-walled portion being larger than that of the other portion of said trim portion.

5. A weather strip according to claim 4, wherein said thick walled portion is made of solid rubber.

6. A weather strip according to claim 4, wherein said thick-walled portion is made of sponge rubber.

* * * * *